(12) United States Patent
Tita et al.

(10) Patent No.: US 11,752,760 B2
(45) Date of Patent: Sep. 12, 2023

(54) METHOD OF PRINTING PRINTED PRODUCTS USING PRINTING NOZZLES WITHOUT DEFECTS AND DEFECTIVE NOZZLES THAT HAVE BEEN COMPENSATED FOR

(71) Applicant: Heidelberger Druckmaschinen AG, Heidelberg (DE)

(72) Inventors: Ralf Tita, Hirschhorn (DE); Hans Köhler, Edingen-Neckarhausen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 18/156,772

(22) Filed: Jan. 19, 2023

(65) Prior Publication Data
US 2023/0241885 A1    Aug. 3, 2023

(30) Foreign Application Priority Data
Feb. 3, 2022   (DE) .................... 10 2022 102 523.3

(51) Int. Cl.
*B41J 2/045*  (2006.01)
*G06T 7/00*  (2017.01)
*B41J 29/393*  (2006.01)

(52) U.S. Cl.
CPC ....... *B41J 2/04508* (2013.01); *B41J 2/04586* (2013.01); *B41J 29/393* (2013.01);
(Continued)

(58) Field of Classification Search
CPC .. B41J 2/04508; B41J 2/04586; B41J 29/393; B41J 2029/3935; G06T 7/0004; G06T 2207/30144
See application file for complete search history.

(56) References Cited

U.S. PATENT DOCUMENTS 9,174,475 B2   11/2015   Ueshima
9,573,383 B2    2/2017   Ukishima
(Continued)

FOREIGN PATENT DOCUMENTS

DE    102015116852 A1   4/2016
EP        2845735 B1   9/2019

*Primary Examiner* — Lisa Solomon
(74) *Attorney, Agent, or Firm* — Laurence A. Greenberg; Werner H. Stemer; Ralph E. Locher

(57) ABSTRACT

A method of printing improved printed products using defect-free printing machine nozzles and compensated defective nozzles includes printing products and a test chart with test fields onto a transported substrate, the test fields having tonal values, every test field including an unprinted line from a nonactivated, nonprinting nozzle compensated by a neighboring nozzle having a compensation value, pairs of tonal value and compensation value being specified and used for the chart, recording an image of the chart, computer-analyzing the image and determining the compensation value. Every pair of tonal value and compensation value is used multiple times in the chart and a corresponding number of spaced apart test fields is created. A characteristic value representing test field homogeneity and determining compensation value quality is assigned to every measuring field. The best characteristic value regarding a specified criterion and the compensation value is determined for every tonal value.

16 Claims, 5 Drawing Sheets

(52) U.S. Cl.
CPC ..... *G06T 7/0004* (2013.01); *B41J 2029/3935* (2013.01); *G06T 2207/30144* (2013.01)

(56) References Cited

U.S. PATENT DOCUMENTS

| | | |
|---|---|---|
| 2012/0050377 A1 | 3/2012 | Ueshima |
| 2015/0062233 A1 | 3/2015 | Ueshima |
| 2017/0282535 A1 | 10/2017 | Shibata |
| 2019/0160809 A1* | 5/2019 | Neeb ..................... B41J 2/0451 |
| 2021/0001638 A1 | 1/2021 | Shibata |

* cited by examiner

METHOD OF PRINTING PRINTED PRODUCTS USING PRINTING NOZZLES WITHOUT DEFECTS AND DEFECTIVE NOZZLES THAT HAVE BEEN COMPENSATED FOR

CROSS-REFERENCE TO RELATED APPLICATION

This application claims the priority, under 35 U.S.C. § 119, of German Patent Application DE 10 2022 102 523.3, filed Feb. 3, 2022; the prior application is herewith incorporated by reference in its entirety.

FIELD AND BACKGROUND OF THE INVENTION

The invention relates to a method of printing printed products using printing nozzles without defects and defective printing nozzles that have been compensated for.

The technical field of the invention is the field of the graphic industry, in particular the field of industrial, i.e. highly productive inkjet printing on flat substrates, i.e. the field of applying tiny drops of liquid inks jetted by using nozzles in accordance with the image onto printing substrates in the form of sheets, webs, foil, or labels, preferably made of paper, cardboard, plastic, metal, or compounds, while compensating for nozzles that do not jet ink or jet ink in an undesired way, for instance by using neighboring nozzles.

DESCRIPTION OF THE RELATED ART

In general, every inkjet printing head has a plurality of individually controllable nozzles. The nozzles are in general disposed in a row of nozzles or in multiple rows of nozzles in parallel with (or at a slight angle to) the direction of transport of the printing substrate. When it is actuated, every nozzle generates one or more drops of ink. When a nozzle is continuously actuated, it prints a visible line in the color of the ink onto the printing material. On the other hand, if a nozzle fails, for instance because its nozzle opening is blocked by solidified ink, or if a nozzle jets drops at an angle or merely as a mist, a visible light line (also referred to as a missing nozzle, missing line, or white line) may be created. The undesired result is that the color of the printing substrate, usually white, shines through along a line in the printed image. In addition, visible dark lines may be created, for instance if missing nozzles are overcompensated.

In an industrial environment, nozzles that do not print at all or nozzles that print in an undesired way need to be compensated for because customers will not tolerate white lines in high-quality printed products. A known method makes use of the fact that the printing nozzles are capable of jetting drops of different sizes as a function of how they are actuated. In that way, neighboring nozzles (to the left and right of the defective nozzle) may be used to jet larger compensatory ink drops, thus jetting surplus ink to close the white line entirely or at least to an extent at which the naked eye will no longer perceive it as a defect.

An abbreviation that is common in this context is "MNC" for "missing nozzle compensation" or, in more general terms, "malfunctioning nozzle compensation," i.e. it refers to compensating for printing nozzles that do not print at all or print in an undesired way.

A known way of identifying those nozzles that do not print or print in an undesired way and of finding their positions in a row of nozzles is to print a test chart that has been configured for that purpose, recording the printed test chart, for instance by using a camera, and analyzing the recorded image by using a computer. In that process, a compensation value may be determined for a nozzle that has been found in need of compensation. That compensation value defines the required degree of compensation, for instance low compensation or high compensation.

For instance, in claim 1, European Patent EP 2 845 735 B1, corresponding to U.S. Pat. No. 9,174,475 B2, discloses an image recording device in the field of inkjet printing. The device includes an optimization device for a correction parameter for a defective recording element and a reading device for reading a test table that has been created and for generating reading data. The optimization device includes an analysis device for analyzing the reading data. In that process, a concentration in a measuring table is compared to a concentration in an area of even concentration for every correction parameter for a defective recording element and an optimum value of the correction parameter for the defective recording element is derived. The optimum value for the correction parameter for the defective recording element is the one that corresponds to a measuring table concentration that minimizes a concentration difference relative to the area of even concentration.

In the prior art, defects may continue to be visible in the printed image even though failed nozzles and nozzles that do not print correctly have been compensated for. That is especially true if the determination and setting of compensation values is a manual process. For instance, when UV inks are used, even slight undercompensation may result in an undesired depression that is visible in the UV ink layer ("like a scratch").

SUMMARY OF THE INVENTION

It is accordingly an object of the invention to provide a method of printing printed products using printing nozzles without defects and defective nozzles that have been compensated for, which overcomes the hereinafore-mentioned disadvantages of the heretofore-known methods of this general type and which, in particular, further improve compensation for failed nozzles and nozzles that do not print correctly and thus enhance the quality of the print.

With the foregoing and other objects in view there is provided, in accordance with the invention, a method of printing printed products using nozzles that are free from defects and defective nozzles that have been compensated for, which comprises the steps of providing a printing machine with printing nozzles to print the printed products and to print a test chart, printing the test chart including a plurality of test fields onto a printing substrate that is being transported, the test fields being created as halftones with a respective tonal value from among a specified set of tonal values and printed by multiple printing nozzles, every test field including an unprinted line created by a printing nozzle that has not been activated and therefore does not print, the unprinted line being compensated for by at least one active neighboring nozzle, a compensation value for the neighboring nozzle being selected from a specified set of compensation values, and a plurality of pairs formed of a tonal value and a compensation value being specified and used for the test chart, and a plurality of pairs formed of a tonal value and a compensation value being specified and used for the test chart, recording an image of the test chart by using at least one image recording system, using at least one computer to analyze the image and to determine the compensation values for the printing operation to print the printed products and printing the printed products, every specified pair formed of a tonal value and a compensation value is used multiple times in the test chart and for every pair, a corresponding number of test fields is created at locations spaced apart from one another in the test chart, and a characteristic value determining a quality of the compensation value is assigned to every measuring field in the analyzing step, the characteristic value representing the homogeneity of the test field in the x direction, and a characteristic value that is the best possible one in terms of a specified criterion and thus is the compensation value to be applied in the printing operation to print the printed products is determined for every one of the tonal values.

Advantageous and thus preferred further developments of the invention will become apparent from the dependent claims as well as from the description and drawings.

Advantageous Embodiments and Effects of the Invention

The invention advantageously provides a further improvement of the compensation for failed nozzles and of nozzles that do not print correctly and thus further enhances the quality of the print.

In accordance with the invention, the compensation values are not determined in a manual process but are advantageously determined by a method utilizing a test chart that is treated, i.e. printed, recorded, and specifically analyzed, in an automated way. The recording is preferably done by using a camera. The analysis is preferably done by using a digital computer.

The automated determination of the compensation value (MNC value) in accordance with the invention thus utilizes a test chart with test fields in which a respective printing nozzle is artificially switched off and tests are made to compensate for the respective nozzle with the aid of a set of test parameters. This element is preferably recorded by using an industrial line scan camera under bright-field illumination.

The compensation value to be selected in each case may be a function of a waveform for nozzle actuation or the amount of ink thus generated, the utilized substrate, the utilized ink, the tonal value to be generated, and possibly of specific printing head properties (such as specific printing head halves or rather the ink drop generation timing differential thereof).

Moreover, there is a large variety of different substrates (and halftones, inks) with different properties. Therefore, no default compensation value may be determined and provided for each substrate. Thus the compensation values are preferably determined directly at the printing machine. The method of the invention provides an automated way of quickly determining the compensation value for unknown substrates immediately at the machine.

The method of the invention preferably envisages printing an extended range of different compensation values such as 5, 10, 15, 20, ..., 200 at different tonal values/area coverages such as 0, 3, 6, 9, 12, 15, 18, ..., 31 (notation: occupied print dots weighted in accordance with drop size).

In accordance with a preferred feature, a defect location (the unprinted line) is generated in every test field, preferably approximately at its center, and is compensated for by a compensation algorithm which is preferably known and provided. The metrics/the characteristic value for an automated computer-assisted analysis to find out whether the quality of the compensation is sufficient is preferably the standard deviation (preferably over a line averaged in the y direction).

A measurement sheet, i.e. a printed sheet bearing the test chart, includes test fields of different tonal values and lines created by nozzles that have been deliberately switched off and have preferably been compensated for by different compensation values/different parameterizations of a compensation algorithm that has been provided.

A specific combination (tonal value and compensation value) may advantageously be printed multiple times onto the measurement sheet at different locations—preferably across multiple measurement sheets or printing section lengths—to be able to average noise, specific properties of the nozzles in the printing heads, different recording properties of cameras, and other process variations.

In addition, the measurement sheet may include at least one solid tone strip (in the x direction) of a suitable tonal value. Such a solid tone strip may advantageously be used to identify nozzles which have actually failed—i.e. which have not been deliberately switched off/not actuated. The test fields that include nozzles that have actually failed are then excluded from the algorithm. This is another reason why multiple prints of the same combination of tonal value and compensation value are advantageous.

Since there may be camera crosstalk when the test field is recorded, preferably only a section in the x direction is selected and then a profile in the y direction is created.

If a current compensation value in a test field is too low, a peak is found in the analysis of the gray values of the camera image of the test field. A compensation value that is too high, however, results in an opposite peak. Yet an optimum compensation value does not cause any relevant peak—neither an upward one nor a downward one—or, if it does, it will get lost in noise. A metrics/characteristic value which may preferably be used to assess the quality of the compensation is the standard deviations over an area in the x direction.

The Following is a Preferred Example Including Steps 1 to 5:

1. All test fields/the measured gray tonal values of every test field are preferably subjected to a linearization for better comparability between tonal values, i.e. a gray profile is converted into a density profile. Possible calculation: density=1*log10((value−IMax)/(INull−IMax)) The fundamental idea is to weight white lines and/or dark lines in a similar way for all tonal values.

2. Additional basic fields are preferably used as comparison to the test fields. In accordance with a preferred feature, the brightest and darkest test fields are identified. Basis fields without artificial white lines and printed onto a separate sheet or in a separate layout on the same sheet are preferably used to determine the intensities INull (density of the substrate) and IMax (darkest field). Since a dark line may be even darker than a darkest field, for instance, the darkest field is preferably scaled again.

3. Test fields with nozzles that may truly have failed are preferably eliminated from the process. For this purpose, the positions of nozzles that have actually failed may be determined promptly after the test print has been printed (or even at the same time) by performing detection steps (recording and analyzing). An additional solid tone strip may be checked for artefacts (white lines), for instance by checking for peaks in the signal in a direction perpendicular to the printing direction y, preferably by digital image processing measures. All measurement fields which are in the region of the artefacts that have been found in this way are then preferably eliminated from the further steps. Calculating the standard deviation across a region that includes the white line results in a standard deviation for every test field, e.g. for a combination of tonal value and compensation value. All test fields with the same tonal value and the same parameterization of the compensation are preferably regarded as a group. Again a standard deviation (of the standard deviations of the individual fields) is preferably calculated from this set of values (corresponding to the number of fields). If a value is outside the standard deviation, the field is preferably eliminated from the group.

4. Each test field is preferably assigned a characteristic value, which preferably corresponds to a homogeneity of the print (the more homogeneous the test field, the better the compensation of the nozzle works). The characteristic values of the test fields of an identical combination of tonal value and compensation parameter are preferably combined to form a single characteristic value representative of the combination. The standard deviation is preferably calculated as a metrics/characteristic value of the compensation quality. An average is preferably calculated from all test fields with the same tonal value and the same parameterization of the compensation. This is preferably done for all groups. The result is, for instance, a matrix of tonal values and compensation values with a value of the standard deviation representing a measure for the quality of the compensation of the utilized parameterization.

5. Then the best characteristic value per tonal value is preferably determined. This is the compensation value to be applied for this tonal value. The best compensation value for a given tonal value is preferably selected as the one for which the standard deviation is the smallest.

Further Developments of the Invention

The following paragraphs describe preferred further developments of the invention (in short: further developments).

A further development may be characterized in that the standard deviation is used as the characteristic value. The criterion of the standard deviation in the test field is sufficient to assess of whether a test field is better or worse than another test field.

A further development may be characterized in that the standard deviation is determined across a predefined region in the x direction, i.e. in a direction transverse to the direction of transport of the printing substrate.

A further development may be characterized in that in the analysis, a matrix of the standard deviation values as a function of the tonal value and compensation value is created.

A further development may be characterized in that the specified criterion that is utilized is the following: that the best characteristic value is defined as the one which corresponds to the smallest standard deviation.

A further development may be characterized in that in the analysis, characteristic values of test fields with the same combination of tonal value and compensation parameters are combined to form respective sets of characteristic values and that from every such set, the respective best characteristic value is determined.

A further development may be characterized in that in the analysis, the measuring fields are subjected to a linearization process to provide comparability between different tonal values of the measuring fields.

A further development may be characterized in that the test chart includes additional basis fields, which are generated in a solid tone, and in that in the analysis, a comparison is made between test fields and basis fields.

A further development may be characterized in that the basis fields are used by light measurement technology to determine an intensity INull of the printing substrate and/or an intensity IMax of the darkest test field and/or of the darkest line that has been compensated for in a test field.

A further development may be characterized in that the test chart has a two-part configuration where the test fields are disposed in a first part of the test chart and the basis fields are disposed in a second part of the test chart.

A further development may be characterized in that the two parts of the test chart are disposed on the printing substrate so as to be spaced apart from one another in the direction of transport y.

A further development may be characterized in that test fields which include at least one unprinted line of at least one printing nozzle that is activated but prints in an undesired way are excluded from the analysis.

A further development may be characterized in that the test chart has a length L>0 as measured in the direction of transport y of the printing substrate and a width B>0, as measured in the direction transverse to the direction of transport of the printing substrate.

A further development may be characterized in that the test chart includes a plurality of n test fields in the y direction with n>1 and of m test fields in the x direction with m>1.

A further development may be characterized in that the test chart includes a solid tone strip which is printed as a solid tone at a predefined tonal value and has a width B2 with B2>=B.

A further development may be characterized in that the x positions of the printing nozzles that are activated but print in an undesired way are identified and the printing nozzles that have been identified in this way are excluded from the analysis.

A further development may be characterized in that to print the printing image, three different drop sizes S, M, and L—each one having an ink volume VS, VM, and VL, respectively—are being used, with VS<VM<VL.

A further development may be characterized in that to compensate for a respective defective printing nozzle, at least one compensation printing nozzle adjacent to the defective one is utilized to emit a drop of a size S*, M*, or L*, having an ink volume VS*, VM*, and VL*, respectively, with VL*<VL.

A further development may be characterized in that the following additionally applies: VS<VS*.

A further development may be characterized in that the following additionally applies: VM<VM*.

A further development may be characterized in that S, S*, M, and M* drops are used for the printing operation.

A further development may be characterized in that L and L* drops are used for the compensation.

A further development may be characterized in that UV-curable ink is used.

Further Developments of the Invention if an Additional Problem Occurs

In contrast to offset printing, a problem that may occur in printing processes using UV ink is that the ink layer may have such a thickness that under an oblique angle of observation, depressions or scratches in the layer may become visible as a gloss reduction. Such undesired depressions may be created, for instance, when the compensation value is too low (referred to as undercompensation) and thus too little ink reaches the location where compensation is needed. When trying to avoid undesired overcompensation, care must be taken not to undercompensate because undercompensation is likewise undesired.

A further development may be characterized in that the recorded image is analyzed by a digital computer, which generates a matrix, the matrix providing a characteristic compensation value that has been computationally determined for every pair of tonal value and compensation value, and computationally determines an optimum compensation value for every tonal value from among the characteristic values as the compensation value which involves the smallest degree of undercompensation or the smallest degree of overcompensation, in that every tonal value is assigned a compensation value under consideration of a respective determined characteristic value, and in that a print job is printed with the tonal values and the associated compensation values thereof.

A further development may be characterized in that (to avoid undercompensation—which may create depressions reducing gloss—and at the same time to avoid too much overcompensation) at least a plurality of tonal values is assigned a respective compensation value under consideration of a respective characteristic value that has been computationally selected as the predefined characteristic value, wherein the selected characteristic value is selected to differ from the optimum characteristic value for the tonal value in such a limited way that overcompensation occurs in such a way that a predefined overcompensation threshold is respected.

A further development may be characterized in that each characteristic value is a standard deviation with an algebraic sign.

This further development checks whether the profile peak ("valley" or "peak" in the profile of the ink layer) that has the best absolute value is negative or positive. If the peak indicates overcompensation, the set of parameters is used. However, if the peak indicates undercompensation, the test fields with increasing compensation values at a given tonal value are successively examined (in a "tonal value and compensation value" matrix) to find the test field peak which indicates a switch from undercompensation to overcompensation. Then the lowest possible overcompensation is selected as the compensation value. Alternatively, it is possible to increase the compensation value of the lowest possible overcompensation by one or multiple predefined increments to ensure that the gloss reduction caused by depressions is avoided.

Further Developments With a Regression Model

Rather than computationally to determine the optimum compensation value individually for every tonal value, a regression model may be used to approximate a monotonically increasing graph of tonal value and compensation value. Due to the regression model, leaps in the tonal value/compensation value combination, which may, for instance, be caused by noise, may be avoided. Such a regression model may be combined with an extended use of the "standard deviation with algebraic sign."

This process preferably is as follows:

The standard deviation (with or without algebraic sign) is a target value Y and the tonal value X1 and the compensation value X2 are independent variables. On the basis of test data, a regression model defining a monotonically increasing relation between tonal value and compensation value, for instance, may be determined. The regression model is applied to the recorded data. The result is a "smoothed matrix" that provides a way of determining the optimum compensation value for every tonal value. The regression model results in a 2D area of the tonal values and compensation values. Typically, the "valleys in the matrix," i.e. the lowest values, are assumed to be the best compensation. The graph of the best compensations resulting from the regression model may alternatively be shifted in the direction of overcompensation to avoid depressions that may affect the gloss effect.

Due to the regression model, a transformation into a mathematical model is possible, which provides a continuous allocation of optimum compensation values to tonal values. The model may then in turn be converted to discrete concrete nodes.

Any desired combination of the features and combinations of features disclosed in the above sections on the technical field, invention, and further developments as well as in the section below on exemplary embodiments likewise represents advantageous further developments of the invention.

Other features which are considered as characteristic for the invention are set forth in the appended claims.

Although the invention is illustrated and described herein as embodied in a method of printing printed products using printing nozzles without defects and defective nozzles that have been compensated for, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
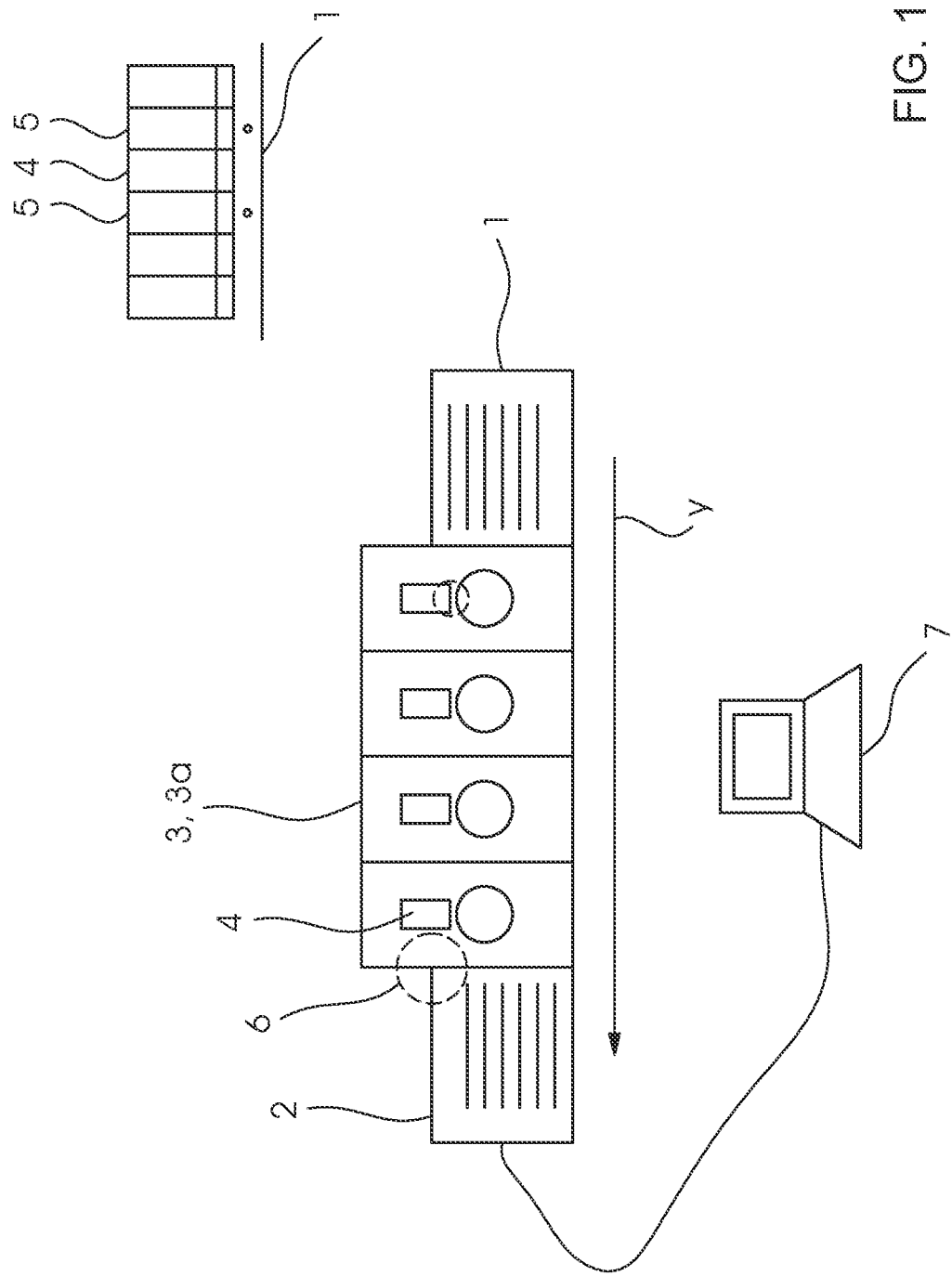
FIG. 1 is a diagrammatic, side-elevational view of a printing machine in the field of the invention.

Referring now to the figures of the drawings in detail and first, particularly, to FIG. 1 thereof, there is seen an implementation of a method of processing printing substrates 1, i.e. of printing printed products 2 using printing nozzles that are fully functional and defective printing nozzles that have been compensated for in a printing machine 3. The printing machine is an inkjet printing machine with multiple printing units 3a for applying printing inks of different colors, preferably of the CMYK process colors. In the illustrated example, the printing substrate is a sheet. Alternatively, the printing substrate that is being processed may be a web of printing substrate. Every printing unit includes a row of printing nozzles 4 (e.g. a so-called printing bar extending in the x direction, i.e. transverse to the direction of transport y of the printing substrate) for jetting and applying ink drops. Except for the marginal nozzles, every printing nozzle 4 has two neighboring nozzles 5 (as is visible in the enlarged view of the printing gap rotated through 90°). In addition, the printing machine has an image recording system 6, in particular a camera, as well as a digital computer 7, e.g. a control unit for controlling the printing machine.

Figure 2:
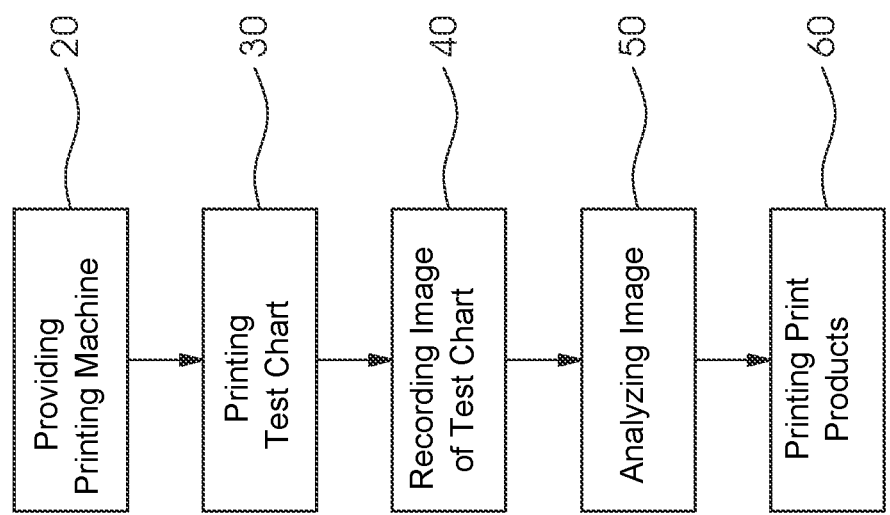
FIG. 2 is a flow chart illustrating a preferred exemplary embodiment of a method of the invention.

FIG. 2 is a flow chart of a preferred exemplary embodiment of a method of the invention. The method includes multiple successive steps: Providing 20, printing the test chart 30 (preferably using the printing machine 3), recording 40 (preferably using the image recording system 6), analyzing 50 (preferably using the digital computer 7) and printing 60 the printed products (preferably likewise using the printing machine 3). Details of these steps are described in the present application.

Figure 3:
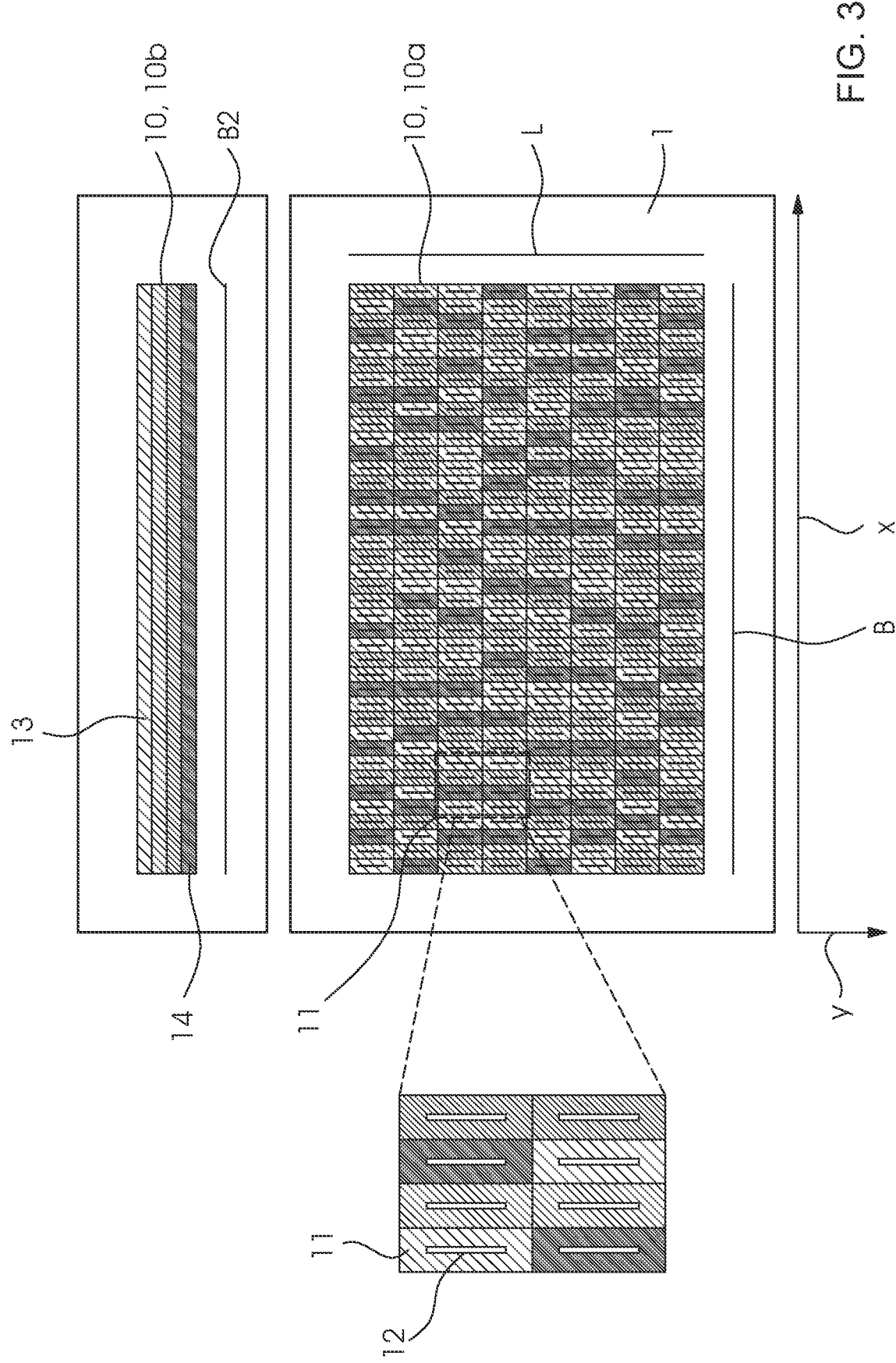
FIG. 3 is a plan view of a test chart in the context of the invention.

FIG. 3 illustrates a test chart 10 that has been printed onto the printing substrate 1. In the example, the test chart is formed of a first part 10a and a second part 10b. The first part of the test chart has a length L in the y direction and a width B in the x direction.

The first part 10a includes a plurality of test fields 11. They are disposed in rows in the x direction and in columns in the y direction like a matrix. What can be seen is that each individual test field is printed in a halftone and every test field has a specific tonal value (different tonal values are indicated by different hatching). Every test field has an unprinted line 12, preferably disposed at the center of the test field. The unprinted lines are created intentionally by temporarily deactivating or not actuating a printing nozzle 4.

The second part 10b includes basis fields 13 and a solid tone strip 14, which has a length B2 in the x direction.

Figure 4:
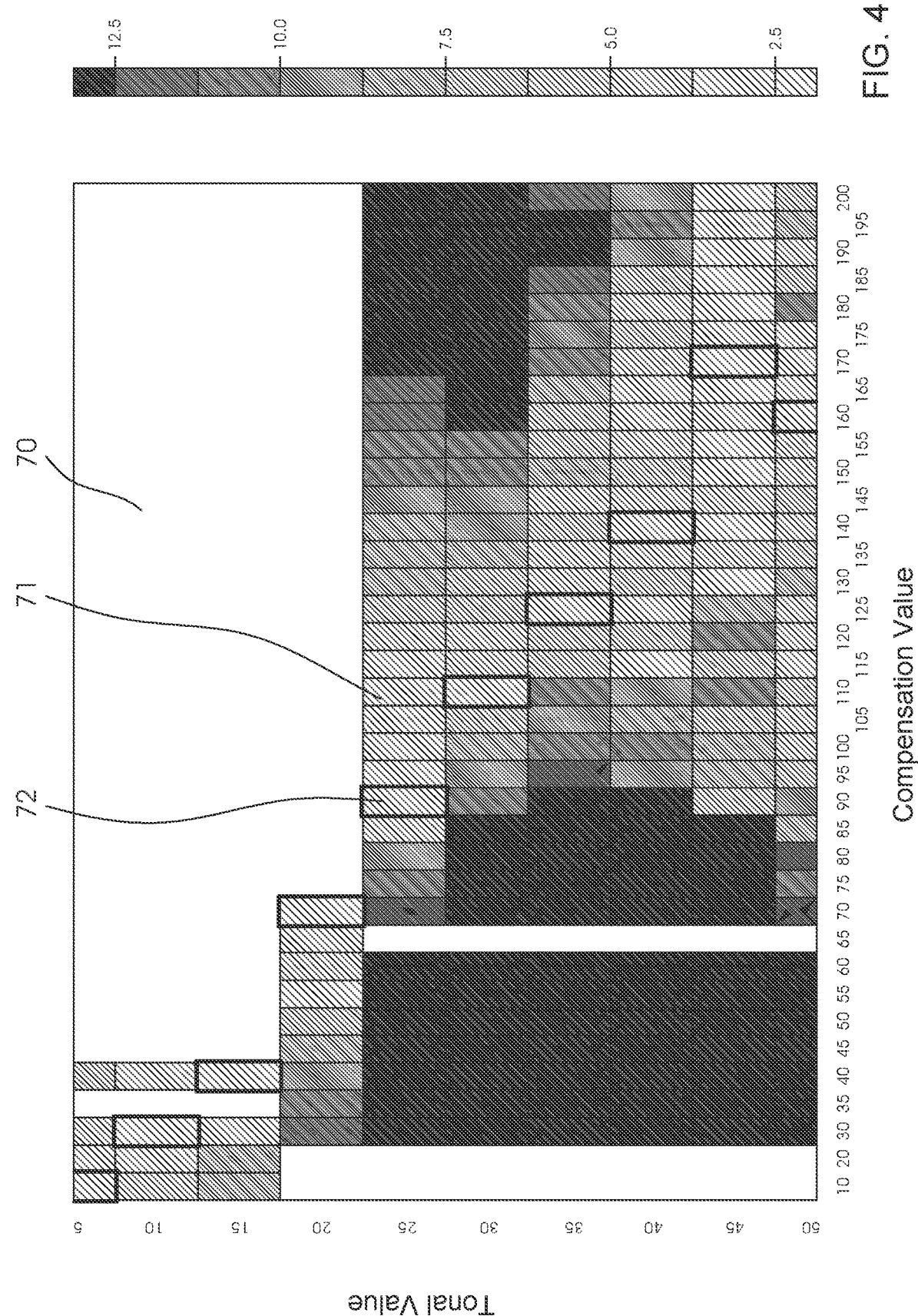
FIG. 4 is a diagram illustrating a matrix in the context of the invention.
Figure 5:
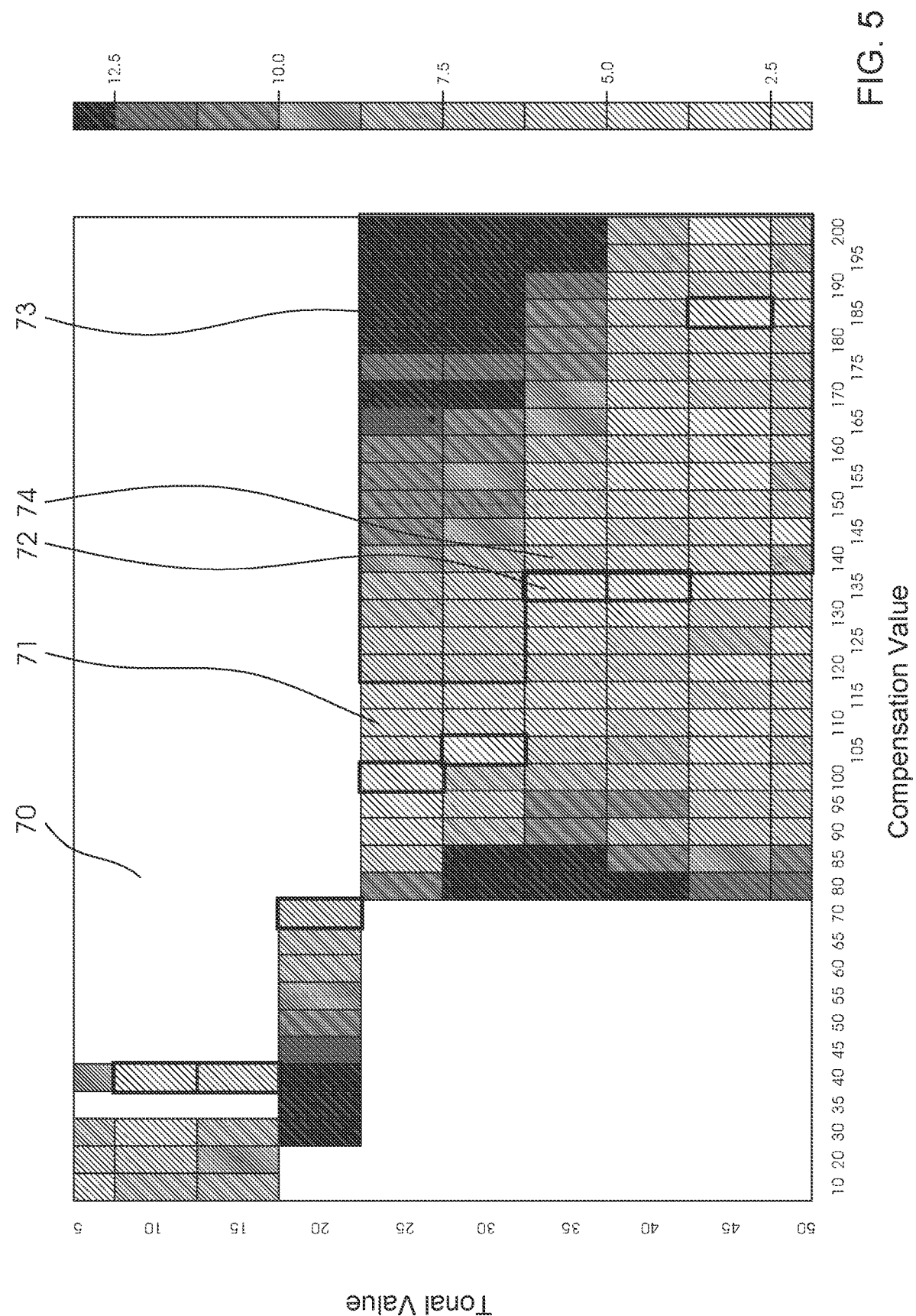
FIG. 5 is a diagram illustrating a further matrix in the context of the invention.

FIG. 4 illustrates a matrix 70 with the compensation value and the tonal value as the axes of a coordinate system and a plurality of matrix fields 71. FIG. 5 likewise illustrates such a matrix 70 with matrix fields 71. Both matrices have preferably been generated by the computer 7 and most preferably in the analyzing step 50. A scale is shown next to each one of the matrices to indicate the value (preferably values of the standard deviation) each hatching stands for. In addition, some matrix fields in both matrices are shown to have a frame; they are referred to herein as "selected matrix fields" 72. In every row, i.e. for a given tonal value, the selected matrix fields indicate the matrix field with the lowest value. The calculation of the selected matrix fields is also preferably done by using the computer 7.

FIG. 4 indicates the following: the analyzing step 50 includes computationally determining the selected matrix fields 72. A compensation value preferably to be selected may then be assigned to a given tonal value via the selected matrix field. This compensation value corresponds to the best possible compensation within the scope of the method.

FIG. 5 indicates the following: the analyzing step 50 includes computationally determining the selected matrix fields 72. The analyzing step 50 further includes computationally determining an area 73. Matrix fields in this region correspond to overcompensation. Every row of region 73 includes a matrix field 74 which is closest to the selected matrix field (in the illustrated example, it is the matrix field to the left in the region). Via the matrix field 74, a given tonal value may then be assigned a compensation value preferably to be selected. This preferred compensation value corresponds to a "slight" overcompensation, i.e. overcompensation that is not visible, to avoid any visible undercompensation.

The following is a summary list of reference numerals and the corresponding structure used in the above description of the invention.

List of Reference Symbols:
1 printing material
2 printed product
3 printing machine
3a printing unit
4 printing nozzle(s)
5 neighboring nozzle(s)
6 image recording system, in particular camera
7 computer
10 test chart
10a first part of the test chart
10b second part of the test chart
11 test field(s)
12 unprinted line(s)
13 basis field(s)
14 solid tone strip
20 providing
30 printing
40 recording
50 analyzing
60 printing of the print products
70 matrix
71 matrix field(s)
72 selected matrix field(s)
73 region
74 matrix field(s)
x x direction; transverse to direction of transport of the printing substrate
y y direction; direction of transport of the printing substrate
L length y of the test chart in the y direction
B width of the test chart in the x direction
B2 width of the solid tone strip in the x direction

The invention claimed is:

1. A method of printing printed products using nozzles that are free from defects and defective nozzles that have been compensated for, the method comprising steps of:

providing a printing machine with printing nozzles for printing the printed products and for printing a test chart;

printing the test chart with a multiplicity of test fields onto a printing substrate being transported, creating the test fields as halftones with a respective tonal value from among a specified set of tonal values and being printed by multiple printing nozzles, every test field including an unprinted line created by a printing nozzle not being activated and not printing, compensating for the unprinted line by at least one active neighboring nozzle, selecting a compensation value for the neighboring nozzle from a specified set of compensation values, and specifying and using a multiplicity of pairs formed of a tonal value and a compensation value for the test chart;

using every specified pair formed of a tonal value and a compensation value multiple times in the test chart, and for every pair, creating a corresponding number of test fields at locations spaced apart from one another in the test chart;

assigning a characteristic value determining a quality of the compensation value to every measuring field in the analyzing step, the characteristic value representing a homogeneity of the test field in the x direction, and determining a best characteristic value in terms of a specified criterion and the compensation value to be applied during printing to print the printed products for every one of the tonal values;

recording an image of the test chart by using at least one image recording system;

using at least one computer to analyze the image and to determine the compensation value for the printing operation to print the printed products; and printing the printed products.

2. The method according to claim 1, which further comprises using a standard deviation as the characteristic value.

3. The method according to claim 2, which further comprises determining the standard deviation across a specified region in an x direction transverse to a y direction of transport of the printing substrate.

4. The method according to claim 2, which further comprises, in the analyzing step, creating a matrix of standard deviation values as a function of the tonal value and of the compensation value.

5. The method according to claim 2, which further comprises providing the specified criterion by defining the best characteristic value as a characteristic value corresponding to a smallest standard deviation.

6. The method according to claim 1, which further comprises, in the analyzing step, combining characteristic values of test fields with a same combination of tonal value and compensation parameters to form respective sets of characteristic values, and determining a respective best characteristic value from every one of the sets.

7. The method according to claim 1, which further comprises, in the analyzing step, subjecting the measuring fields to a linearization process to provide comparability between different tonal values of the measuring fields.

8. The method according to claim 1, which further comprises including basis fields in the test chart, creating the basis fields in a solid tone, and including a comparison between test fields and basis fields in the analyzing step.

9. The method according to claim 8, which further comprises using the basis fields to determine at least one of an intensity of the printing substrate or and intensity of a darkest test field or of a darkest line having been compensated for in a test field by using light measuring technology.

10. The method according to claim 8, which further comprises providing the test chart with a structure including first and second parts, locating the test fields in the first part of the test chart and locating the basis fields in a second part of the test chart.

11. The method according to claim 10, which further comprises locating the first and second parts of the test chart on the printing substrate so as to be spaced apart from one another in a direction of transport of the printing substrate.

12. The method according to claim 1, which further comprises excluding from the analysis test fields including at least one unprinted line of at least one printing nozzle being active but not printing or printing in an undesired way.

13. The method according to claim 1, which further comprises providing the test chart with a length L measured in a direction y of transport of the printing substrate with L>0 and a width B measured in a direction transverse to the direction of transport of the printing substrate with B>0.

14. The method according to claim 1, which further comprises providing the test chart with a plurality of n test fields in a y direction with n>1 and m test fields in the x direction with m>1.

15. The method according to claim 13, which further comprises providing the test chart with a solid tone strip printed as a solid tone at a predefined tonal value and having a width B2 with B2>=B.

16. The method according to claim 15, which further comprises determining x positions of the printing nozzles being active but not printing or printing in an undesired way in the solid tone strip, and excluding from the analysis the printing nozzles identified as being active but not printing or printing in an undesired way.

* * * * *